(12) United States Patent
Madej

(10) Patent No.: US 7,726,571 B2
(45) Date of Patent: Jun. 1, 2010

(54) SYSTEM AND METHOD FOR BAR CODE DECODING

(75) Inventor: Dariusz Madej, Shoreham, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 977 days.

(21) Appl. No.: 11/287,657

(22) Filed: Nov. 28, 2005

(65) Prior Publication Data
US 2007/0119943 A1 May 31, 2007

(51) Int. Cl.
G06K 7/10 (2006.01)
(52) U.S. Cl. .............................. 235/462.01; 235/462.25
(58) Field of Classification Search ............ 235/462.01, 235/462.25, 462.27
See application file for complete search history.

(56) References Cited

U.S. PATENT DOCUMENTS

| 5,272,323 A | * | 12/1993 | Martino | ................. | 235/462.27 |
| 5,612,531 A | * | 3/1997 | Barkan | ................. | 235/462.27 |
| 2002/0162890 A1 | * | 11/2002 | Tsi et al. | ................ | 235/462.16 |

* cited by examiner

Primary Examiner—Daniel StCyr

(57) ABSTRACT

Described is a system and method for bar code decoding. The system comprises first and second digitizers and a processor. The first digitizer outputs a first digitized representation of a bar code. The second digitizer outputs a second digitized representation of the bar code. The processor compares the first and second digitized representations to yield a set of parameters. The processor selects one of the first and second digitized representations to be decoded as a function of the set of parameters.

11 Claims, 4 Drawing Sheets

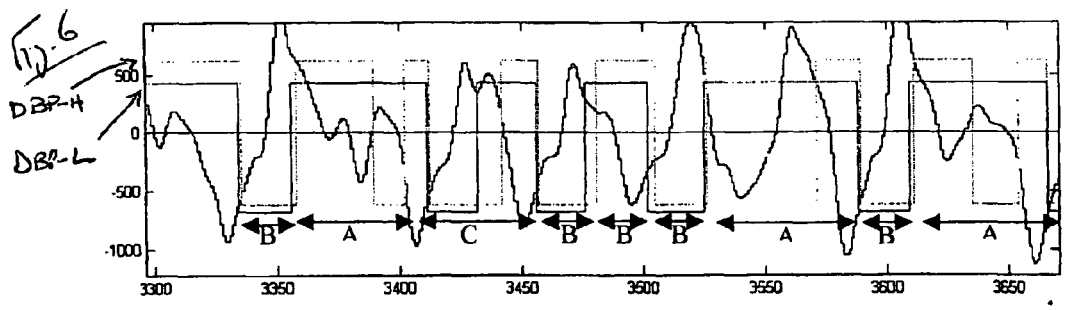
Fig.5 The relationship between DBP-L and DBP-H
(-A-) A sequence of few elements of DBP-H matches a single element of DBP-L.
(-B-) One-to-one match between DBP-H and DBP-L element;
(-C-) Mismatch between a pair of elements of DBP-H and DBP-L.
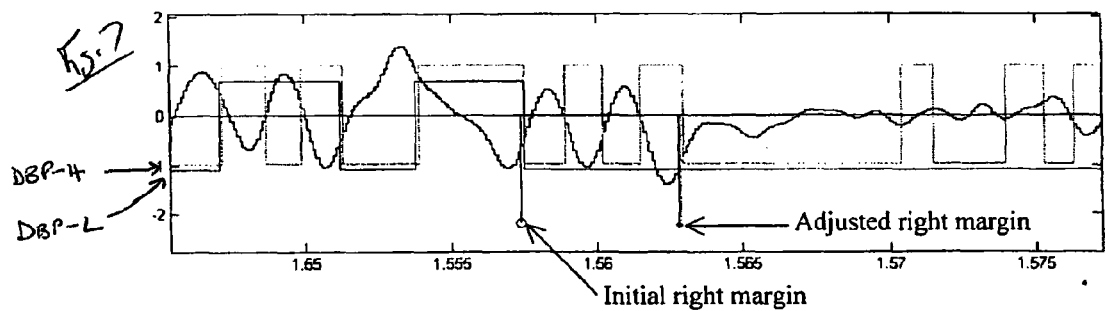
Fig.6 Right margin adjustment algorithm
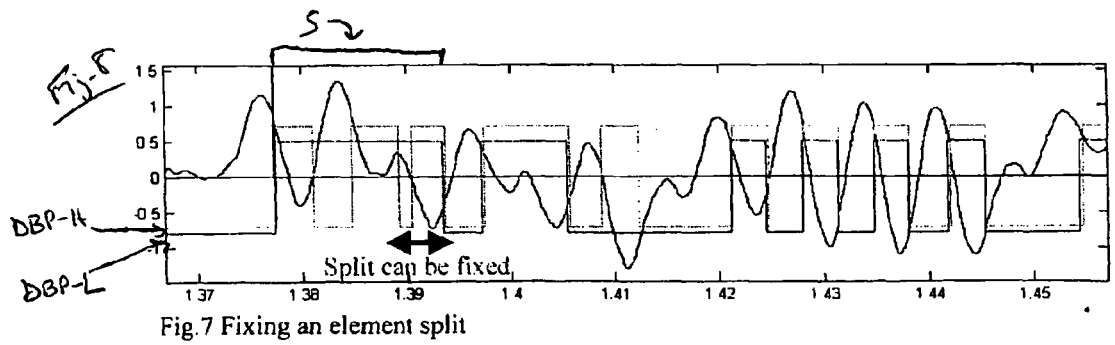
Fig.7 Fixing an element split

SYSTEM AND METHOD FOR BAR CODE DECODING

BACKGROUND INFORMATION

Bar codes have become a part of everyday life. Most, if not all, consumer items have a bar code either on the item or attached to the item in some manner (e.g., a hang tag with a bar code). Organizations such as corporations and hospitals attach bar codes to physical property in order to keep track of the location of this physical property. Warehouses use bar codes on items, pallets, rows of racks, etc. to locate items and for inventory control. There are numerous other examples of bar codes being used for different purposes.

In each of these instances, it is not the act of attaching the bar code to the item that produces the favorable results, but the act of reading the bar code attached to the item and processing the information contained in the bar code, e.g., reading a bar code on a grocery item and charging the customer the correct amount for the grocery item. However, in many instances, the reading of the bar code is not an easy or straightforward task to accomplish. There may be instances where there is a problem with the bar code itself, e.g., the bar code image is not sufficiently sharp or has become damaged in some way, or instances where the reader causes a problem, e.g., the bar code reader cannot be placed close enough to the bar code to obtain a sharp image. If the bar code cannot be read, the myriad of benefits associated with bar coding items will not be realized.

SUMMARY OF THE INVENTION

The present invention relates to a system and method for bar code decoding. The system comprises first and second digitizers and a processor. The first digitizer outputs a first digitized representation of a bar code. The second digitizer outputs a second digitized representation of the bar code. The processor compares the first and second digitized representations to yield a set of parameters. The processor selects one of the first and second digitized representations to be decoded as a function of the set of parameters.

The method comprises generating first and second digitized representations of a bar code. The representations are compared to yield a set of parameters. One of the representations is selected for decoding as a function of the set of parameters.

In another aspect, the present invention includes a computer-readable storage medium storing a set of instructions which are capable of being executed by a processor. The set of instructions performing the steps of generating first and second digitized representations of a bar code, comparing the representations to yield a set of parameters and selecting one of the representations for decoding as a function of the set.

BRIEF DESCRIPTION OF THE DRAWINGS

FIG. 6 shows an exemplary embodiment of a high sensitivity digitized bar pattern and a low sensitivity digitized bar pattern according to the present invention.

FIG. 7 shows an exemplary embodiment of a high sensitivity digitized bar pattern and a low sensitivity digitized bar pattern according to the present invention.

FIG. 8 shows an exemplary embodiment of a high sensitivity digitized bar pattern and a low sensitivity digitized bar pattern according to the present invention.

DETAILED DESCRIPTION

Figure 1:
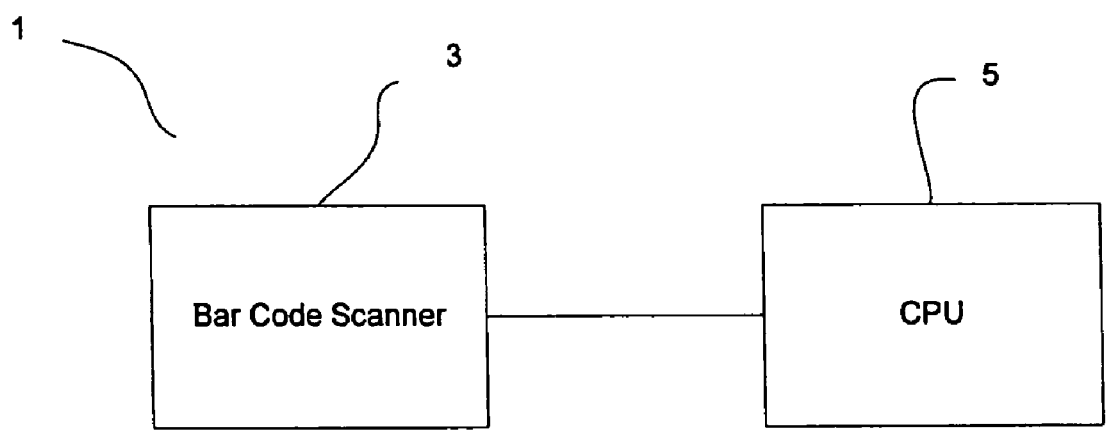
FIG. 1 shows an exemplary system for detecting and decoding a bar code.

The present invention may be further understood with reference to the following description and the appended drawings, wherein like elements are provided with the same reference numerals. The present invention discloses a system and method for decoding a barcode. The exemplary embodiments will be described with reference to a laser bar code scanner which generates at least two digitized bar patterns for a single scan. Based on a comparison of the patterns, the scanner selects one, or a combination of the patterns for decoding. From the following description, those of skill in the art will understand that the present invention may improve margin detection, bar code element size estimation and blur and noise detection.

FIG. 1 shows an exemplary system 1 for detecting and decoding a bar code. A bar code scanner 3 which collects data from a bar code may be a laser bar code scanner. A laser bar code scanner collects data points using a reflection of a laser beam off of the bar code. The bar code scanner 3 collects the data from the bar code (e.g., data points) and may also perform some front end or pre-processing of the data. The bar code scanner 3 then sends either the raw data or the pre-processed data (in the case where the bar code scanner 3 includes front end processing capabilities) to a memory of a CPU 5. The CPU 5 includes a decoding engine which accesses the memory and completes the decoding of the bar code by processing the data forwarded by the bar code scanner 3 to extract the information contained in the bar code.

The scanner 3 may utilize one or more front end processing components. A bar code pattern scanned by the scanner 3 includes a series of bars and spaces. A typical laser bar code scanner generates several tens of thousands of data points per scan (e.g., 30,000 data points/scan) and makes multiple scans per second (e.g. 30 to 500 scans per second, with 100 scans being common for a hand held scanner). A reflectance pattern, i.e., inverse of the bar code pattern, is convoluted with the laser beam of the scanner 3 to yield a laser signal which is input into a differentiator to yield a differentiated signal. The differentiated signal may be input into one or more signal conditioning elements (e.g., an auto gain control element, a noise control element, low-/high-pass filers, etc.) to prepare the differentiated signal for being digitized.

Figure 2:
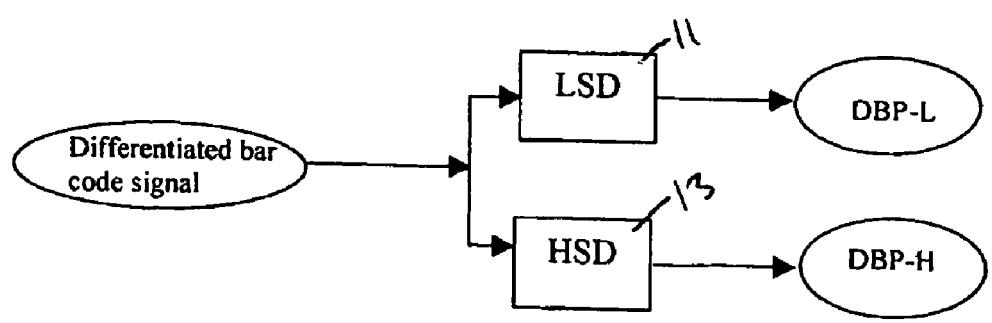
FIG. 2 shows an exemplary embodiment of front-end processing components of a laser bar code scanner according to the present invention.

As shown in FIG. 2, the differentiated signal (e.g., an input signal) is then simultaneously input into a first digitizer (e.g., a low sensitivity digitizer (LSD) 11) and a second digitizer (e.g., a high sensitivity digitizer (HSD) 13). Each digitizer uses different criteria for detecting edges of the bar code within the input signal. For example, the LSD 11 may use a dual-criteria filter for detecting the edges. A first condition may be a signal drop (e.g., a signal level change when the input signal goes from a peak to a valley—a space to a bar, or vice-versa). A second condition may be application of a threshold value to the input signal. That is, a level of the input signal in a vicinity of the edge(s) must be greater than the threshold value. Those of skill in the art will understand that the threshold value may be determined as a result of theoretical and/or operational data. Also, the threshold value may be a static value used for each input signal or an updateable value adjusted based on edges detected in previous input signals. The HSD 13 may utilize only the first condition, i.e., the signal drop, for edge detection. Thus, as understood by one of skill in the art, the HSD 13 is more sensitive to variances within the input signal.

The LSD 11 digitizes the input signal generating a low-sensitivity digitized bar pattern (DBP-L), and the HSD 13 digitizes the input signal to generate a high-sensitivity digitized bar pattern (DBP-H). When a good quality bar code (e.g., low blur, sharp contrasts, etc.) is scanned, the DBP-L and the DBP-H should be substantially similar so that decoding one or both provides the scanned bar code. However, it is often likely that the bar code is not good quality. For example, the bar code may be exhibit faults such as light printing, damage, missing portions, etc. In some scanning situations, a size of the laser beam may exceed a size of a bar code element by a factor of two or more, resulting in a significantly blurred signal. Also, a scanning environment may affect the input signal. For example, ambient light during the scan and/or distance between the scanner 3 and the bar code may contribute to distortion of the input signal. In any case, a poor quality bar code or blur may result in an input signal which yields a DBP-L different from the DBP-H. Thus, one or a combination of the DBPs will be selected for decoding, as will be described below.

Figure 3:
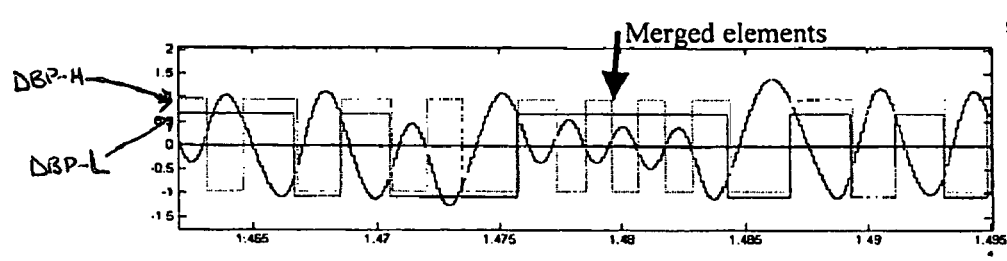
FIG. 3 shows an exemplary embodiment of a high sensitivity digitized bar pattern and a low sensitivity digitized bar pattern according to the present invention.

In the case of blur, the LSD 11 may fail to detect the edges of two or more consecutive narrow elements of the bar code, merging a sequence of consecutive bar(s) and/or space(s) into a single merged element, as shown in FIG. 3. FIG. 3 also shows that the HSD 13 may detect the sequence of elements which were merged by the LSD 11. Thus, in the case of blur, the DBP-H may be selected for decoding, because it is a more accurate representation of the bar code than the DBP-L.

Figure 4:
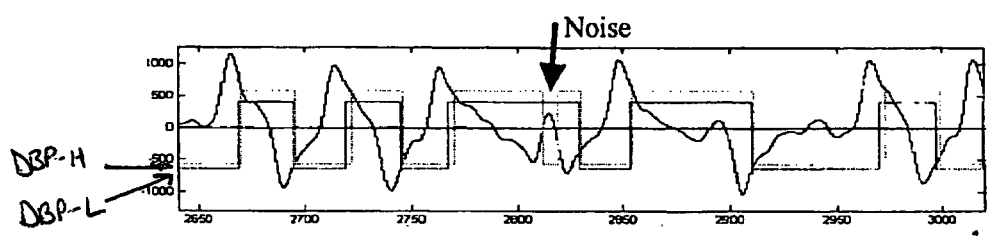
FIG. 4 shows an exemplary embodiment of a high sensitivity digitized bar pattern and a low sensitivity digitized bar pattern according to the present invention.

In the case of the poor quality bar code, noise and/or the faults may result in one or more false edges in the DBP-H, as shown in FIG. 4. That is, the high sensitivity of the HSD 13 may detect the false edges which are, in actuality, noise or other distortions. FIG. 4 also shows that the DBP-L does not exhibit the false edges, because of the LSD 11 utilizes the threshold value, as described above.

Figure 5:
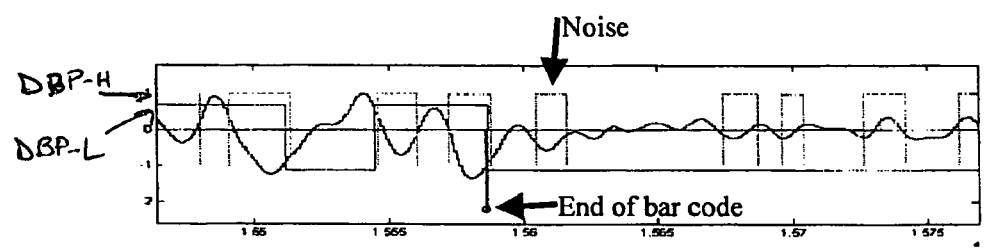
FIG. 5 shows an exemplary embodiment of a high sensitivity digitized bar pattern and a low sensitivity digitized bar pattern according to the present invention.

In a combined case, i.e., blur and the poor quality bar code, the DBP-H and the DBP-L may each be partially correct but exhibit the false edges and merged elements, respectively. In this case, neither the DBP-H nor the DBP-L are suitable for decoding. However, as seen in FIG. 5, the DBP-H may be corrected by the DBP-L, or vice-versa, to yield the bar code signal. FIG. 5 shows an end (e.g., a right margin) of the bar code detected by the LSD 11. However, past the end, the HSD 13 has detected a false edge due to noise, incorrectly estimating the right margin of the bar code. If this false edge were eliminated from the DBP-H, it may yield an accurate representation of the bar code.

A conventional laser scanner attempts to decode both the DBP-L and the DBP-H. However, processors utilized by the laser scanners, in particular, handheld laser scanners, are not powerful enough to decode the DBPs in parallel. Thus, the scanners use a trial-and-error approach alternating between decoding the DBP-L and the DBP-H until the bar code is decoded. As described above, this approach may require processing the DBP-L with merged elements and/or the DBP-H with false edges (or any other errors that may be present in the signals). These decoding efforts are a waste of processing cycles and power, because many input signals may have to be digitized before the bar code is obtained. Thus, the present invention provides a focused approach to selecting one or a combination of the DBPs enhancing efficiency over the trial-and-error approach of the conventional laser scanner.

A selection algorithm is used to select one of and/or combine the DBPs, detect margins of the bar code and, optionally, limit noise around the margins. The input signal is input to the LSD 11 and the HSD 13 yielding the DBP-L and the DBP-H, respectively. A conventional center-out margin search is executed on the DBP-L. For example, a predetermined number of elements (e.g., approximately 7) around a center of the DBP-L are analyzed to determine a width of a narrowest element referred to as a reference value (Ref_Val). Initial estimations of left and right margins of the bar code are obtained starting from the center and moving in both directions therefrom. When a predetermined width is detected at each end, a left margin Left_Margin_L and a right margin Right_Margin_L are identified. The predetermined width may be computed as the Ref_Val times a multiplier (e.g., approximately 6-10) chosen based on symbology, a width of a widest element of the bar code and a maximum number of consecutive narrow elements in a valid symbol.

The DBP-H is then compared to the DBP-L to determine an element in the DBP-H which aligns with the Left_Margin_L in the DBP-L. An absolute position of the Left_Margin_L is computed as a sum of all elements in the DBP-L from a first element in the scan to the Left_Margin_L. The sum is then used to count successive elements in the DBP-H beginning with a first element thereof. If the sum terminates at an element representing a bar in the bar code, that element is identified as a Left_Margin_H. Otherwise, an adjacent element representing a bar is designated as the Left_Margin_H.

Segments of the DBP-L and the DBP-H beginning with the Left_Margin_L and the Left_Margin_H, respectively, and extending to the Right_Margin_L and a Right_Margin_H are analyzed to determine a relationship between a train of elements comprising the segments. For example, FIG. 6 shows potential relationships between elements of the segments. A plurality of elements in the DBP-H which align with a single element (e.g., the merged element) in the DBP-L are denoted as A. A single element in the DBP-H which aligns with a single element in the DBP-L is denoted as B. A region where the elements do not align is denoted as C. Those of skill in the art will understand that "align" is used generally to mean that the respective element(s) are in substantially similar positions within the respective scans.

The relationships between elements in the segments of the DBP-H and the DBP-L yield one or more of the following additional data:

Right_Margin_H—an index to an element in the DBP-H which aligns with the Right_Margin_L;

Num_Mis—a number of elements which do not match (e.g., regions C);

Num_O2M—a number of sequences of two or more elements in the DBP-H which align with a single element in the DBP-L (e.g., regions A);

Min_O2M—a width of a narrowest element selected from the sequences of elements which align with the single element(s) in the DBP-L (e.g., regions B);

Min_L—a width of a narrowest element in the segment of the DBP-L between the Left_Margin_L and the Right_Margin_L; and Min_H—a width of a narrowest element in the segment of the DBP-H between the Left_Margin_H and the Right_Margin_H.

The above-described widths of the narrowest elements (e.g., Min_O2M, Min_L and Min_H) may be substituted with a statistical evaluation of a set of the smallest values from, e.g., mean, median, etc., in order to decrease a chance of incorrect estimation due to noise. In a preferred embodiment, a width of a second narrowest element is used, because the second narrowest element may be less susceptible to noise than the narrowest element. Also, computing the widths of the second narrowest elements may require less computations.

From analysis of the DBP-L, the DBP-H and the additional data, it is determined whether the DBP-L and the DBP-H are identical, or whether the bar code is blurred and/or noisy. Exemplary logic for this determination is as follows:

```
If Num_O2M > 0
{
    If 0.82 < (Min_H / Min_O2M) < 1.15
    {
        blur = True;
        decode DBP-H (adjust Right_Margin_H)
    }
    ElseIf Min_H / Min_O2M < 0.7
    {
        noise & blur = True;
        If Min_L / Min_O2M < 0.7
            decode DBP-H (rectify false edges)
        Else
            noise = True;
            use DBP-L
    }
    Else
        Undecided, use both DBP-L and DBP-H
}
Else
{
    If Num_Mis == 0
        DBP-H is equivalent to DBP-L
    Else
        Undecided, use both DBP-L and DBP-H
}
```

As understood from the above logic, it is first determined whether there is one or more merged elements in the DBP-L and/or one or more false edges in the DBP-H. If neither of these conditions is present (i.e., Num_O2M=0), the DBP-L and the DBP-H are identical, and either one may be selected for decoding. Otherwise, there may be mismatched elements in the DBP-L and the DBP-H which may be indicative of high noise. In the exemplary embodiment, the selection is based on a diode voltage drop and/or hysteresis. For example, the DBP with a smaller value for the diode voltage drop plus hysteresis is selected. In this manner, an edge position error caused by a digitizer delay may also be limited.

When the DBP-L and the DBP-H are not identical (i.e., Num_O2M>0), the logic proceeds to determine whether the bar code is blurred. In the exemplary embodiment, a ratio of narrow elements widths is computed and compared to a predetermined range of values, so that if the ratio falls within the range, the bar code is blurred. As shown above, the ratio is generated by dividing a width of a narrowest element between the Left_Margin_H and the Right_Margin_H (i.e., Min_H) by a width of a narrowest element in a sequence of elements in the DBP-H which align with a single element in the DBP-L (i.e., Min_O2M). The ratio is then compared to the range of values bounded by a first value (e.g., approximately 0.82) and a second value (e.g., approximately 1.15). Those of skill in the art will understand that the first and second values may be selected using theoretical and/or operational data. When the ratio falls within the range, the bar code is blurred, and the DBP-H is selected for decoding. In the exemplary embodiment, this scenario (i.e., 0.82<Min_H/Min_O2M<1.15) corresponds to blur-only (e.g., zero or substantially limited noise).

When the DBP-H is selected for decoding in the case of blur-only, the Right_Margin_H may be determined with better accuracy, because the Right_Margin_H was previously estimated simply by alignment with the Right_Margin_L. This part of the process is to rectify, for example, a high level of convolution distortion which may have lead to an inaccurate identification of the actual left margin of the bar code. For example, as shown in FIG. 6, if the bar code terminates at the right margin with an even-numbered sequence of narrow elements, the LSD 11 may merge those elements. Thus, the Right_Margin_L, and, consequently, the Right_Margin_H due to alignment therewith, may not accurately represent the actual left and right margins of the bar code. To accurately determine an adjusted Right_Margin_H from the DBP-H, the widths of the elements to the right of the Right_Margin_H are compared to the Ref_Val. Elements may be included in the bar code as long as their respective widths are approximately equal to the Ref_Val, shown in FIG. 7. A last one of the elements (i.e., furthest to the right) is determined to be the adjusted Right_Margin_H. Then, the segment between the Left_Margin_H and the adjusted Right_Margin_H is decoded.

Referring back to the logic, when the ratio of Min_H to Min_O2M falls outside of the range, it is determined whether the ratio is less than a third value (e.g., 0.7). As stated above, those of skill in the art will understand that the third value may be selected using theoretical and/or operational data. When the ratio is less than the third value, it is determined that the bar code is noisy and blurred. A ratio of the width of the narrowest element between the Left_Margin_L and the Right_Margin_L (i.e., Min_L) to the width of the narrowest element selected from the sequences of elements in the DBP-H which align with the single element(s) in the DBP-L (i.e., Min_O2M) is compared to the third value. If the ratio is less than the third value, the DBP-H is selected for decoding. When the ratio is greater than the third value, the DBP-L is selected for decoding.

When the DBP-H is selected for decoding in the case of noise and blur (e.g., a high-density bar code close to the scanner 3), the false edges in the DBP-H are rectified prior to decoding. The false edges may correspond to, for example, additional elements in the DBP-H detected incorrectly inside a wide bar code element, as shown in FIG. 8. To correct the false edges in the DBP-H, each sequence S of two or more elements in the DBP-H which corresponds to a single element in the DBP-L is analyzed. Within an exemplary sequence S, a width of the narrowest element therein is determined (minS). A ratio of the width of the narrowest element (minS) to the Ref_Val is calculated and compared to the third value from above (e.g., 0.7). The ratio being less than the third value may be indicative of a false edge. If the narrowest element is a first element of the sequence S (shown in FIG. 8), a first three elements of the sequence S are replaced with a combined element having a width equal to the combined widths of the first three elements. If the narrowest element is a last element of the sequence S, a last three elements of the sequence S are replaced with the combined element having a width equal to the combined widths of the last three elements. In any other case, the narrowest element is combined with elements immediately to its left and right to form the combined element.

Referring back to the logic, when the ratio of Min_H to Min_O2M falls outside of the range but is greater than the third value (i.e., is between 0.7 and 0.82), the scanner 3 may select the DBP with the smaller value for the diode voltage drop plus hysteresis, as described above. This instance may be indicative of a case of noise, only. Alternatively, the scanner 3 may utilize a conventional decoding approach. That is, the scanner 3 may decode both the DBP-L and the DBP-H in parallel, if the requisite processing power is available, or they may be decoded alternatively from scan to scan.

Figure 9:
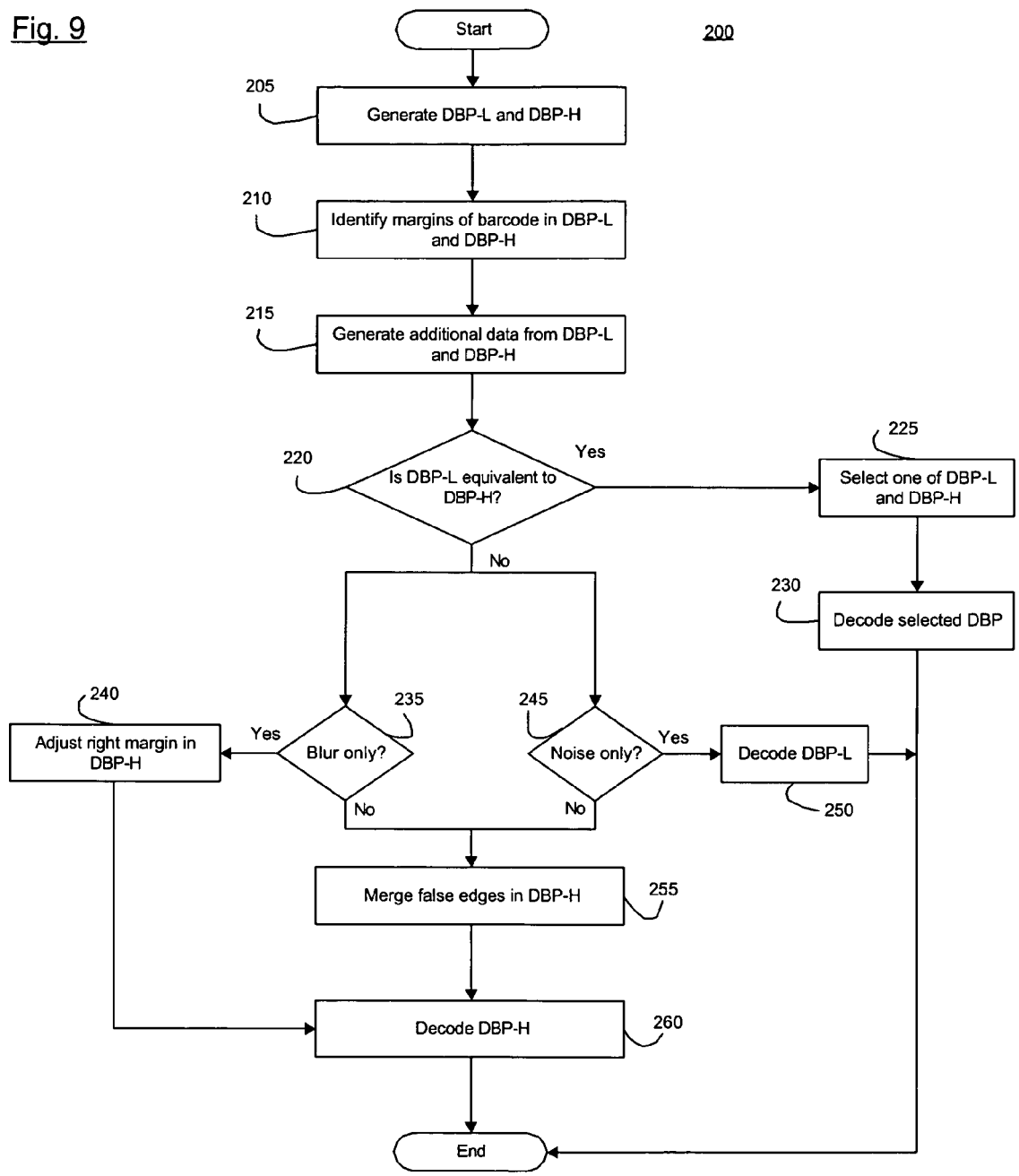
FIG. 9 shows an exemplary embodiment of a method for decoding a barcode according to the present invention.

An exemplary method 200 for decoding a bar code according to the present invention is shown in FIG. 9. In step 205, the DBP-L and the DBP-H are generated by digitizing the differentiated signal. As described above, the differentiated signal is a result of a derivative of the laser signal which may be conditioned by one or more signal condition elements. In step 210, the left and right margins of the bar code are identified in the DBP-L and the DBP-H. That is, the values for the Left_Margin_L, Right_Margin_L, Left_Margin_H and Right_Margin_H are generated as described above. In step 215, the additional data is generated from the comparison/alignment of the DBP-L and the DBP-H. The data includes, but is not limited to, the Num_Mis, the Num_O2M, the Min_O2M, the Min_Mch, the Min_L and the Min_H. The margins and the additional data are utilized to determine which of the DBP-L and the DBP-H is better suited for decoding.

In step 220, it is determined whether the DBP-L is equivalent (e.g., identical) to the DBP-H. When they are equivalent, one of the DBPs is selected based on, for example, the value of the diode voltage drop plus hysteresis (step 225). The DBP with the smaller value is decoded, as shown in step 230. In another embodiment, the DBP may be selected as in a conventional manner, i.e., process simultaneously or alternatively.

In step 235, it is determined whether the bar code is blurred only (i.e., no noise). When the ratio Min_H/Min_O2M is greater than the first value (e.g., 0.82) and less than the second value (e.g., 1.15), the bar code is blurred only. When the bar code is blurred only, the process proceeds to step 240 to adjust the Right_Margin_H in the DBP-H. The DBP-H is then decoded (step 260). In parallel or series with step 235, it is determined whether the bar code is noisy only (i.e., no blur). In the case of noise only, the DBP-L is selected for decoding and decoded (step 250).

When the bar code is both blurred and noisy, the process continues to detect and merge the false edges in the DBP-H, as shown in step 255. Here, if the ratio Min_L/Min_O2M is less than the third value (e.g., 0.7), the false edges are detectable in the DBP-H. The false edges are removed from the DBP-H and the DBP-H is decoded (step 260).

After the decoding is complete, the process 200 should have extracted all the information from the bar code, even blurred and/or noisy bar codes because of the use of the blur and noise decoding portions of the process.

The present invention has been described with the reference to the above exemplary embodiments. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A method, comprising:
generating first and second digitized representations of a bar code;
comparing the representations to yield a set of parameters before decoding the first or second digitized representations;
selecting one of the representations for decoding as a function of the set of parameters; and
wherein the set of parameters includes at least one of (i) a first number of one or more sequences of elements in the second digitized representation corresponding to a single element in the first digitized representation, (ii) a first width of a narrow element in the one or more sequences, (iii) a second width of a narrow element between margins of the bar code in the first digitized representation and (iv) a third width of a narrow element between margins of the bar code in the second digitized representation.

2. The method according to claim 1, wherein the selecting step includes the substep of:
when the first and second digitized representations are equivalent, selecting one of the representations as a function of a first value indicative of a diode voltage drop plus hysteresis for the first digitized representation and a second value indicative of a diode voltage drop plus hysteresis for the second digitized representation.

3. The method according to claim 2, wherein a lesser of the first and second values is selected.

4. The method according to claim 1, wherein the selecting step includes the substep of:
when one of (i) a first ratio of the third width to the first width is within a predetermined range and (ii) the first ratio is less than a predetermined value and a second ratio of the second width to the first width is less than the predetermined value, selecting the second digitized representation.

5. The method according to claim 4, further comprising:
when the second ratio is greater than the predetermined value, selecting the first digitized representation.

6. The method according to claim 4, further comprising:
when in a case of (i), adjusting an estimation of at least one of a left and a right margin of the bar code in the second digitized representation.

7. The method according to claim 4, further comprising:
when in a case of (ii), determining whether to merge at least two consecutive elements in each of the sequences as a function of at least one of (i) a third ratio of a width of a narrowest element in each sequence to a reference width and (ii) a position of the narrowest element in each corresponding sequence.

8. A computer-readable storage medium storing a set of instructions, the set of instructions capable of being executed by a processor, the set of instructions performing the steps of:
generating first and second digitized representations of a bar code;
comparing the representations to yield a set of parameters before decoding the first or second digitized representations;
selecting one of the representations for decoding as a function of the set; and
wherein the set of parameters includes at least one of (i) a first number of one or more sequences of elements in the second digitized representation corresponding to a single element in the first digitized representation, (ii) a first width of a narrow element in the one or more sequences, (iii) a second width of a narrow element between margins of the bar code in the first digitized representation and (iv) a third width of a narrow element between margins of the bar code in the second digitized representation.

9. The storage medium according to claim 8, wherein the instructions further include the steps of:

when the first and second digitized representations are equivalent, selecting one of the representations as a function of a lesser of a first value indicative of a diode voltage drop plus hysteresis for the first digitized representation and a second value indicative of a diode voltage drop plus hysteresis for the second digitized representation.

10. The storage medium according to claim 8, wherein the instructions further include the steps of:

when one of (i) a first ratio of the third width to the first width is within a predetermined range and (ii) the first ratio is less than a predetermined value and a second ratio of the second width to the first width is less than the predetermined value, selecting the second digitized representation; and when the second ratio is greater than the predetermined value, selecting the first digitized representation.

11. The storage medium according to claim 10, wherein the instructions further include the steps of:

when in a case of (i), adjusting an estimation of at least one of a left and a right margin of the bar code in the second digitized representation; and when in a case of (ii), determining whether to merge at least two consecutive elements in each of the sequences as a function of at least one of (i) a third ratio of a width of a narrowest element in each sequence to a reference width and (ii) a position of the narrowest element in each corresponding sequence.

* * * * *